United States Patent
Naffziger et al.

(10) Patent No.: US 9,798,752 B1
(45) Date of Patent: Oct. 24, 2017

(54) SYSTEMS AND METHODS FOR INGESTING RELATIONAL DATA INTO A DELIMITED COLUMN QUALIFIER NOSQL DATABASE

(71) Applicant: STATE FARM MUTUAL AUTOMOBILE INSURANCE COMPANY, Bloomington, IL (US)

(72) Inventors: Bruce Naffziger, Bloomington, IL (US); V. Rao Kanneganti, Swedesboro, NJ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 47 days.

(21) Appl. No.: 14/719,953

(22) Filed: May 22, 2015

(51) Int. Cl.
 *G06F 17/30* (2006.01)
 *G06F 15/16* (2006.01)

(52) U.S. Cl.
 CPC .. *G06F 17/30315* (2013.01); *G06F 17/30339* (2013.01); *G06F 17/30569* (2013.01); *G06F 17/30595* (2013.01); *G06F 17/30864* (2013.01)

(58) Field of Classification Search
 CPC .................................................. G06F 17/30569
 See application file for complete search history.

(56) References Cited

U.S. PATENT DOCUMENTS

2012/0030172 A1* 2/2012 Pareek et al. ................. 707/635
2016/0188710 A1* 6/2016 Dulba Naik ...... G06F 17/30294
 707/737

FOREIGN PATENT DOCUMENTS

CN  103631907 A * 3/2014

OTHER PUBLICATIONS

Sqoop User Guide (v1.4.5) retrieved from wayback machine for Apr. 20, 2015, https://web.archive.org/web/20150420162923/http://sqoop.apache.org/docs/1.4.5/SqoopUserGuide.html#_file_formats.*

(Continued)

*Primary Examiner* — Brittany N Allen
(74) *Attorney, Agent, or Firm* — Marshall, Gerstein & Borun LLP; Randall G. Rueth

(57) ABSTRACT

Methods and systems for ingesting data stored in a relational database into a non-relational delimited column qualifier NoSQL database are provided. According to certain aspects, an ingestion server may receive a request to transform the data stored in the relational database into a delimited column qualifier format. The ingestion server may then identify and query a reference table that defines the delimited column qualifier format. In accordance with the reference table, the ingestion server may transform the data into the delimited column qualifier format. Subsequently, the ingestion server may store the transformed data in the delimited column qualifier NoSQL database. By storing data in the column qualifier database, fewer computer resources are used to store and access the same data that is stored in the relational database. Accordingly, all the transformed data is stored in a single delimited CQ row.

14 Claims, 5 Drawing Sheets

(56) References Cited

OTHER PUBLICATIONS

Huang et al., A Study on the Translation Mechanism from Relational-based Database to Column-Based Database, ICIA 2012.*
Lampe, Migrate a Relational Database Structure into a NoSQL Cassandra Structure (Part 1), DivConq MFT, posted Jul. 7, 2010.*
Khurana, Introduction to HBase Schema Design, Oct. 2012.*
Kerstner, Shortening Strings (URLs) using Base 62 Encoding, retrieved from archive.org on May 15, 2014.*
J. Shute et al., F1: A Distributed SQl Database That Scales supporting Google's ad business. VLBD Endowment, vol. 6, No. 11 (2013).

* cited by examiner

SYSTEMS AND METHODS FOR INGESTING RELATIONAL DATA INTO A DELIMITED COLUMN QUALIFIER NOSQL DATABASE

FIELD OF THE DISCLOSURE

The present disclosure generally relates to the ingestion of data into a non-relational database, more particularly, to systems and methods for transforming and storing data from a relational database into a non-relational delimited column qualifier NoSQL database.

BACKGROUND

Traditionally, many companies store their business records in relational databases which organize a plurality of data tables hierarchally. Each row (or tuple) represents a unique entity (e.g., a user account) and each column represents an attribute (e.g., a first name). Further, each data table in a relational database may contain a set of parent-child relationship data as part of the hierarchical structure. For example, a parent data table may be implemented to store all user accounts for an organization, and each user account may comprise many child data tables describing each insurance policy corresponding to a particular user account.

However, in some aspects, relational databases are not optimal for scalability. In particular, relational databases are not optimal for horizontal scaling (the scaling of data across multiple servers). Since relational databases rely on data stored in inter-related tables, it is difficult to efficiently distribute the data across multiple servers. As a result, each query for data stored in a horizontally-scaled relational database may require accessing data stored in many different servers and subsequently joining the results together. This increases both the time to perform each query, as well as the likelihood of an error occurring.

As another example, in order to maintain the structural integrity of the relational database, attributes that have no value may require storage of a null character. For certain types of customer profile data, it may not be uncommon for the field to be blank or unknown. For example, not every customer may provide a middle name or an apartment number. As a company grows, the amount of data that must be stored typically also increases, further increasing the amount of storage dedicated to storing null characters. For large volumes of data, the amount of storage spent storing null characters may be significant.

Non-relational databases may solve this problem by storing data in a format organized by unique columns. Only data that actually exists (i.e., non-null data) is referenced in each column. Moreover, since all of the data is stored in a single row in a non-relational database, it can be efficiently accessed without joins when stored across multiple servers. One way to reference data stored in these columns is through the usage of a column qualifier. However, due to their structural differences, it is not simple to convert data between relational and non-relational databases. One previous attempt to solve this problem stored data using a positional column qualifier to refer to a particular set of data. However, the positional column qualifier solution requires the use of a byte for each data table in the relational database. As the number of data tables increases, the amount of storage dedicated to storing each positional column qualifier (and thus the overall size of the column qualifier) increases as well.

The present embodiments may, inter alia, alleviate these inefficiencies to further reduce the storage required to store large volumes of data than a positional column qualifier database while maintaining the same or similar hierarchical functionality.

SUMMARY

In one aspect, a computer-implemented method for ingesting data stored in a relational database into a delimited column qualifier database may be provided. The method may include (1) receiving, via a computer network, a request to transform the data stored in the relational database into a format consistent with a delimited column qualifier database, the request including an indication of a set of the data stored in the relational database to be transformed. The method may also include (2) identifying, by one or more processors, a reference table, wherein the reference table defines the data format of the delimited column qualifier database, and (3) transforming, by the one or more processors, the indicated set of the data stored in the relational database to the delimited column qualifier format defined within the reference table. Further, the method may include (4) storing, by the one or more processors, the transformed data in the delimited column qualifier database, wherein the delimited column qualifier database requires less storage than the relational database to store the same data. The method may include additional, fewer, or alternate actions, including those discussed elsewhere herein.

In another aspect, a system for ingesting data stored in a relational database into a delimited column qualifier database may be provided. The system may include a communication module to communicate data, a non-relational delimited column qualifier database, a memory adapted to store non-transitory computer executable instructions, and/ or one or more processors adapted to interface with the communication module and the delimited column qualifier database. The one or more processors may be configured to execute the non-transitory computer executable instructions to cause the one or more processors to (1) receive, via the communication module, a request to transform the data stored in the relational database into a format consistent with a delimited column qualifier database, the request including an indication of a set of the data stored in the relational database to be transformed The one or more processors may be also be configured to (2) a reference table, wherein the reference table defines the data format of the delimited column qualifier database, and (3) transform, by the one or more processors, the indicated set of the data stored in the relational database to the delimited column qualifier format defined within the reference table. The one or more processors may further be configured to (4) store, by the one or more processors, the transformed data in the delimited column qualifier database, wherein the delimited column qualifier database requires less storage than the relational database to store the same data. The system may include additional, less, or alternate components and functionality, including that discussed elsewhere herein.

In still another aspect, a non-transitory computer-readable storage medium storing processor-executable instructions may be provided. When executed, the instructions may cause one or more processors to (1) receive, via a communication network, a request to transform data stored in the relational database into a format consistent with a delimited column qualifier database, the request including an indication of a set of data stored in the relational database to be transformed. The instructions may also cause the one or more processors to (2) identify, by the one or more processors, a reference table, wherein the reference table defines the data format of the delimited column qualifier database, and (3) transform, by the one or more processors, the indicated set of data stored in the relational database to the delimited column qualifier format defined within the reference table. The instructions may further cause the one or more processors to (4) store, by the one or more processors, the transformed data in the delimited column qualifier database, wherein the delimited column qualifier database requires less storage than the relational database to store the same data. The non-transitory computer-readable storage medium may include additional, fewer, or alternate instructions, including those discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
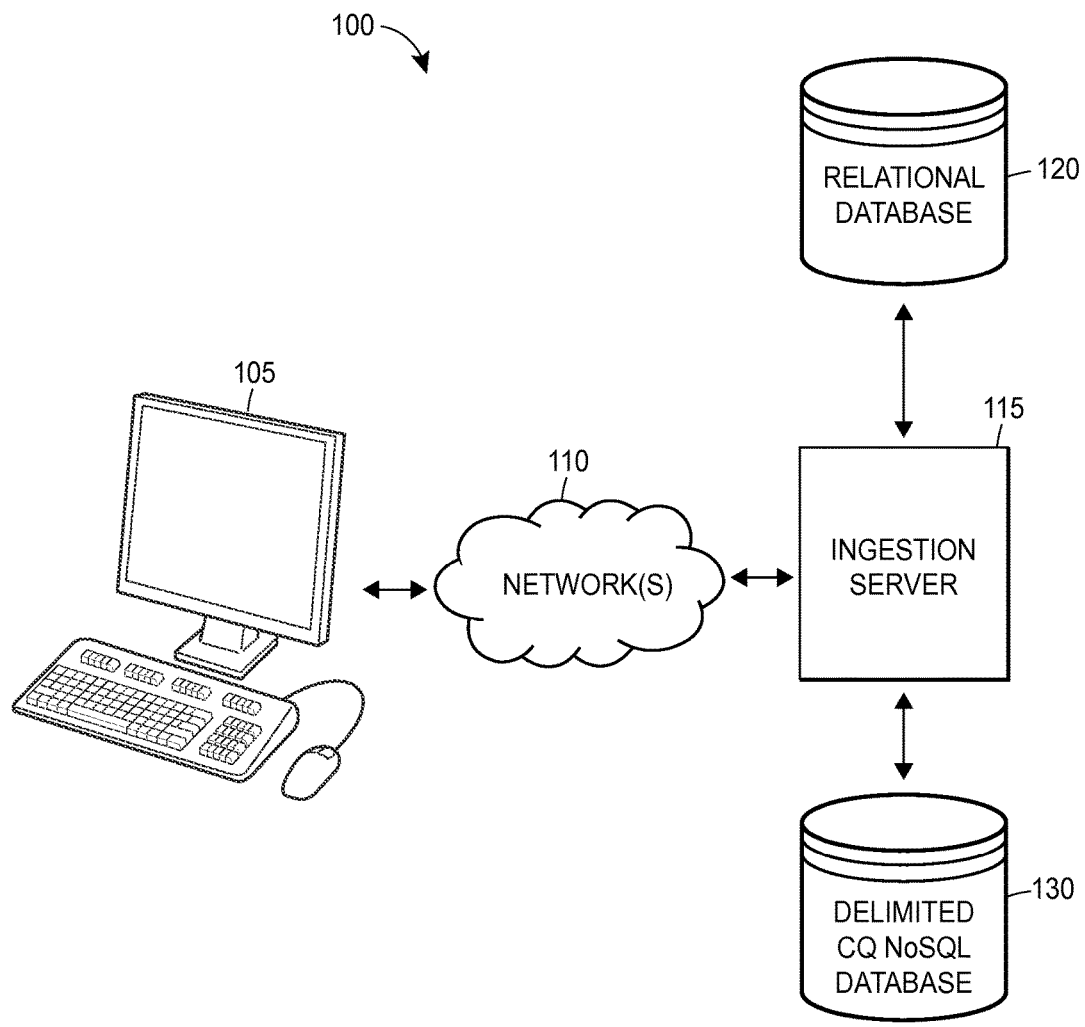
FIG. 1 depicts an example environment including components and entities associated with transforming contents of a relational database into a format consistent with a delimited column qualifier NoSQL database, in accordance with some embodiments.

The novel methods and systems disclosed herein may relate to, inter alia, the transformation of data stored in relational databases to a format consistent with a delimited column qualifier ("CQ") NoSQL database. The transformed data from the relational database may be entire data tables, recently updated portions of the relational database, and/or any other set of data stored in the relational database. In transforming the data from the relational database, a reference table that defines the format of the column qualifier may be queried. The transformed data may then be stored in the delimited CQ NoSQL database.

As used herein, the term "ingestion" refers to the transformation of data originally stored in a relational database and the subsequent storage in a non-relational database. The ingestion process includes the conversion of the data into a format consistent with the non-relational NoSQL database, for example, a delimited CQ format. The ingestion process will be discussed in further detail below. Additionally, as used herein, the term "relational data" refers to data stored in a relational database.

The systems and methods therefore may offer a benefit to reduce the amount of storage space required to store large volumes of hierarchally-related data contained within the disclosed systems. This reduction of storage enables a company to store more hierarchally-related data at a lower expense by eliminating the need to purchase additional server space and the corresponding energy and cooling costs. Moreover, even when additional servers are added, data stored in a delimited CQ format may be accessed more efficiently than data stored in a relational database. As a result of this more efficient way of storing data hierarchically, the systems enable a reduction in the operating time of any system that accesses the data in the non-relational database, including the presently disclosed systems. This reduction in operating time may enable present embodiments to reduce their overall clock cycle period and increase the amount of instructions that can be processed within a given time interval. In some scenarios, the savings derived from more efficient storage and access may lead to companies offering products and services to their customers at lower rates.

It should also be understood that, unless a term is expressly defined in this patent using the sentence. "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

I. Exemplary Environment for Ingestion of Relational Data

FIG. 1 depicts an example environment 100 associated with ingesting data stored in a relational database (such as relational database 120) into a non-relational database (such as delimited CQ NoSQL database 130). Although FIG. 1. depicts certain entities and components, it should be appreciated that additional or alternate entities and components are envisioned.

As shown in FIG. 1, the environment 100 may contain a user device 105 which may be a computer, a laptop, a PDA, a mobile phone, a tablet or any other electronic computing device. The user device 105 may be utilized to direct or control the ingestion of the relational data via a user interface. For example, the user may utilize the user device 105 to create and transmit instructions to convert a particular set of data stored in the relational database 120. In some embodiments, the user may include in the transmission a reference table defining how the data stored in the relational database 120 should be converted.

According to present embodiments, the user device 105 may be configured to communicate with an ingestion server 115 via a network 110, such as, for example, a wide area network (WAN), a local area network (LAN), a personal area network (PAN), or other networks. The network 110 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). According to embodiments, the ingestion server 115 may be any combination of hardware and software modules. For example, the ingestion server 115 may contain a software module representative of an entity ingestion process and a memory to store a reference table.

The ingestion server 115 may be communicatively coupled to both the relational database 120 and the delimited CQ NoSQL database 130. According to some embodiments, the relational database 120 and the delimited CQ NoSQL database 130 can include any type of storage capable of storing data in their respective formats. For example, the relational database 120 and the delimited CQ database 130 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In some embodiments, the relational database 120 may be an IBM DB/2® database and the delimited CQ NoSQL database 130 may be an Apache HBase™ database. Of course, the delimited CQ NoSQL database 130 may be implemented using any other non-relational database, such as, MongoDB, Redis, and/or the like. Although the user device 105, the relational database 120, and the delimited CQ NoSQL database 130 are depicted as single entities, it should be appreciated that any number of user devices and databases are envisioned. For example, in some embodiments, multiple delimited CQ NoSQL databases may be implemented and the user may direct which delimited CQ NoSQL database may actually store the ingested data.

II. Exemplary Transformation of Relational Data

Figure 2:
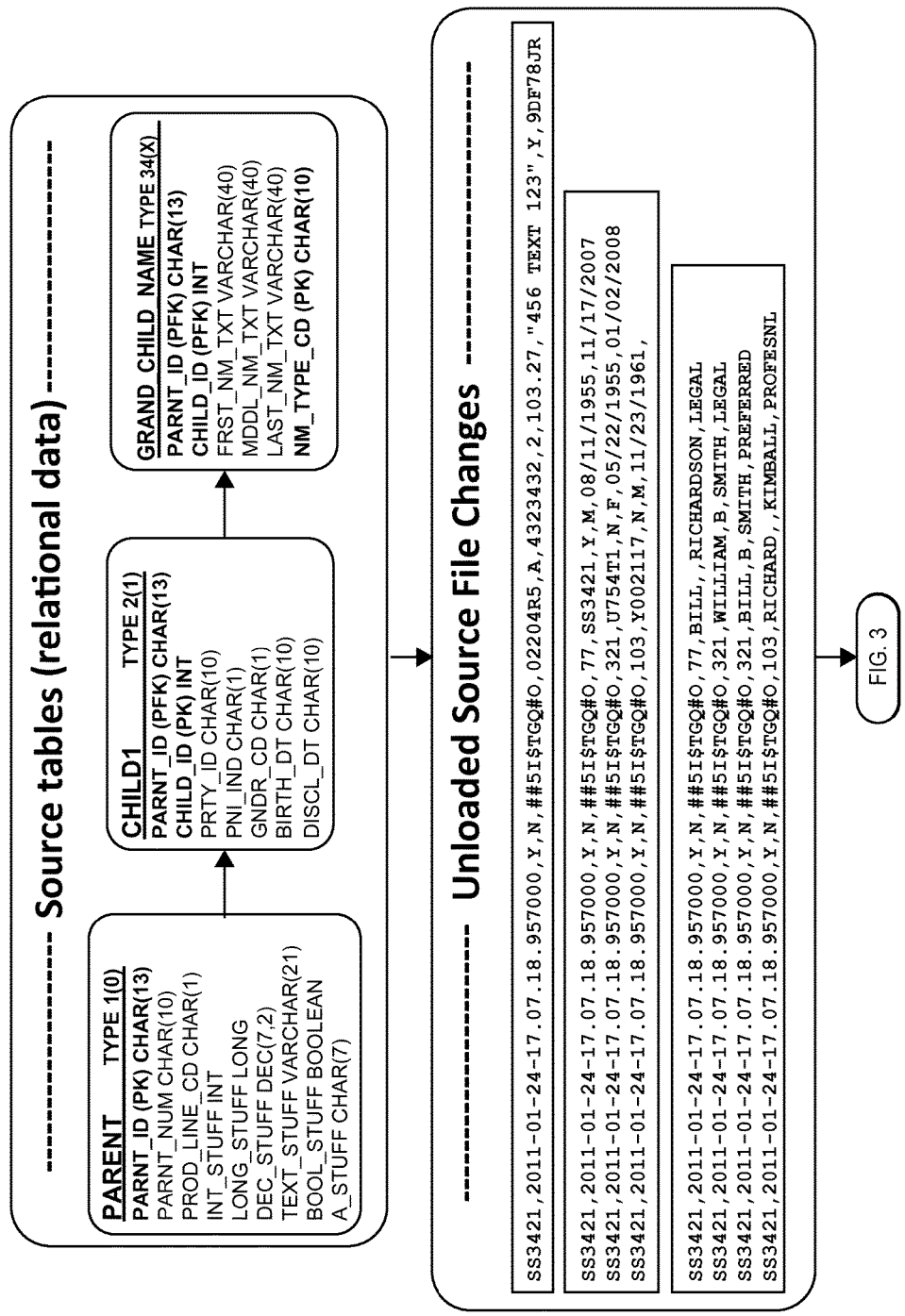
FIG. 2 depicts a representation of how data may be stored and extracted from an exemplary relational database, such as the relational database depicted in FIG. 1, in accordance with some embodiments.
Figure 3:
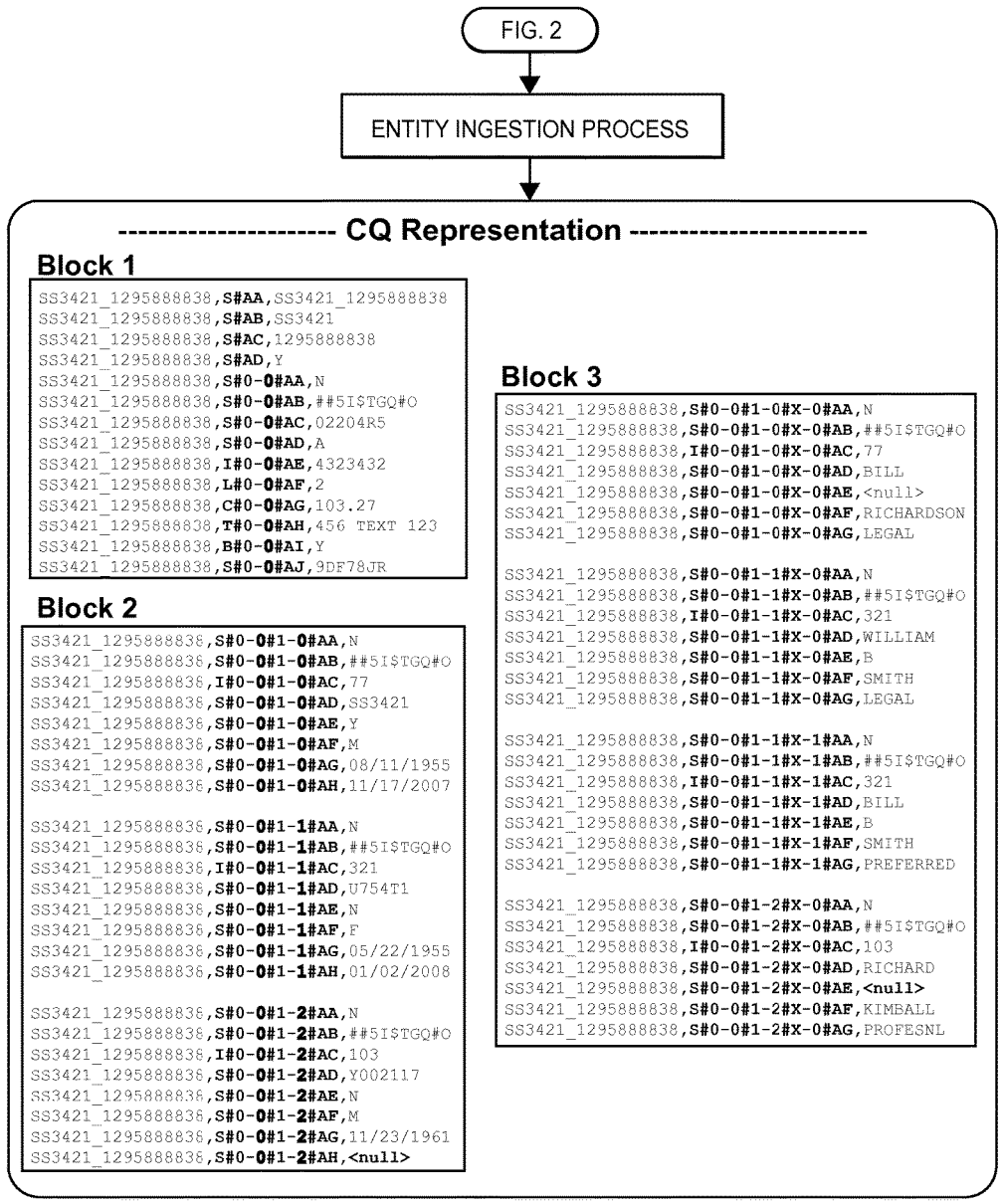
FIG. 3 depicts a representation of how the exemplary data of FIG. 2 may be represented in a delimited column qualifier NoSQL database, such as the delimited column qualifier NoSQL database depicted in FIG. 1, after transformation, in accordance with some embodiments.

FIGS. 2-3 depict a visual representation of a transformation of data from a traditional relational database into a delimited CQ format. It should be appreciated that FIGS. 2-3 depict one exemplary transformation and that relational data may be transformed using other methods while still falling within the scope of the claimed invention.

Referring now to FIG. 2, the upper box provides an exemplary set of data tables maintained by a company in a relational database (such as relational database 120 as depicted in FIG. 1). The data tables in the upper box are depicted with their name in addition to a list of attributes corresponding to each column of the respective data table. The respective lists of attributes include a name of the attribute, a data format for the attribute, and (if applicable) an indication of the length of an expected data value that may be stored in the column corresponding to the attribute. For example, in the "Parent" table, the listed attribute "DEC_STUFF DEC(7,2)" indicates that the name of the column is "DEC_STUFF," the expected data format is a decimal number, and the length of the expected data values are 7 digits before the decimal point and 2 digits after the decimal point.

Additionally, above each depicted data table is an Entity Type number representative of a unique identifier assigned to that data table. As will be explained in more detail later, the number in the parentheses indicates the base 62 ASCII conversion of the Entity Type number that comprises part of the delimited column qualifier.

FIG. 2 also depicts the hierarchal relationship between the three tables. In this example, the "Parent" table is the parent of the "Child1" table which is in turn the parent of the "Grand_Child_Name" table. It should be appreciated that only tables connected by an arrow are "related" (i.e., the "Parent" table and "Grand_Child_Name" table are not "related"). That said, as used herein, the phrase "every parent" in reference to a data value refers to the parent row of the data value, the parent row of the parent row of the data value, and so on. Further, the horizontal arrows represent a "one to many" relationship. Accordingly, each row in the "Parent" table may relate to any number of "Child1" rows. Of course, in other embodiments, any number of data tables may be arranged in any arrangement of hierarchical relationships.

Turning to the lower box in FIG. 2, depicted is exemplary unloaded data stored in the data tables described in the upper box. The unloaded data may be a printout or other visual representation of all the rows or tuples stored in each data table that have been recently modified. According to some embodiments, these modified rows are sent to the ingestion server to store or update data in a delimited CQ NoSQL database. In the depicted example, the "Parent" table contains one modified row, the "Child1" table contains three modified rows and the "Grand_Child_Name" table contains four modified rows. In the present depiction of unloaded data, each attribute or column is separated by a comma. As an example, the "Grand_Child_Name" table in the upper box contains an attribute list corresponding to the last four columns of each row, which, in the present example, represent a first name, a middle name, a last name and a name type, respectively. Looking to the unloaded data in the lower box, the first row of the unloaded "Grand_Child_Name" data indicates that an entry for a person having a first name of "BILL," a null (non-provided) middle name, a last name of "RICHARDSON," and a name type of "LEGAL" may have been recently modified.

In this example, one may notice that the first 4 attributes for all of the unloaded data are identical. These attributes refer to the Party ID of each unique row in the "Parent" table. Since all the data in the "Child1" table relate to the same parent row, this data is hierarchically related to the same Party ID. Similarly, all data in the "Grand_Child_Name" table, via its relation to the "Child1" table, are hierarchically related to the same Party ID. A benefit of converting relational data to the delimited CQ format is that all of the depicted unloaded data is contained within one row in the delimited CQ NoSQL database. Therefore, the Party ID corresponding to each row is only stored once per row in the delimited CQ NoSQL database, and not once per each child, and hierarchically related rows thereof, in the relational database. This may significantly reduce the amount of storage dedicated to data that previous systems would have stored repetitively across multiple relational data tables.

Referring now to FIG. 3, the unloaded data from the lower box of FIG. 2 is transmitted as an input to an entity ingestion process. This process is described in detail with respect to FIG. 4 below. The output of the entity ingestion process is depicted in FIG. 3 inside the CQ representation box. Each "row" in the depiction represents a tuple and the entire collection of tuples comprises a "row" in the delimited CQ NoSQL database (such as the delimited CQ NoSQL database 130 as depicted in FIG. 1). Each tuple contains an indication of a row key, a column qualifier, and a data value. For ease of explanation, the tuples are broken into three separate blocks based on whether the source data value was originally stored in the "Parent," "Child1," or "Grand_Child_Name" table. In this example, the row key is the same for each tuple as all of the modified tuples are part of the same row in the delimited CQ NoSQL database.

After the row key, each tuple contains a column qualifier. In this implementation, the first character of the column qualifier indicates the format of the corresponding data value. As an example, if the first character is an "S," then the data value may be in a String format. Similarly, if the first character is an "I," then the data value may be in an Integer format. It should be appreciated that the format of the data value may be the same as the format indicated for the corresponding attribute in the relational data table depicted in the upper box in FIG. 2. In the present implementation, the next character may always be a delimiter character, such as the "#" symbol, indicating the start of the nested hierarchy data. As used herein, "IV symbol" may be used interchangeably with "first delimiter character." After the nested hierarchy data is a final "#" symbol indicating the end of nested hierarchy data. It should be appreciated that if there is no nested hierarchy data (i.e., the data attribute is constant for all data values in the delimited CQ row), the first and the last "#" symbol may be the same symbol. After the final "#" symbol, the column qualifier contains a column name. In the depicted example, a two-position set of characters (e.g., "AD") is used to represent the column name. In other implementations, the column name may be represented by a descriptive name. For example, the column name for a first name may be a name such as any of "First_Name_TEXT," "firstNameText," "FRST_NM_TXT," "frstNmTxt," and/or the like.

Looking to the first block of tuples representative of data values originally stored in the "Parent" table, the first four tuples contain no hierarchical data since they are constant for all data in the same row in the delimited CQ NoSQL database. Conversely, when a tuple contains nested hierarchy data, it may be represented as pairs of CQ characters, wherein each character is separated by a second delimiter character, such as the "-" symbol. As used herein, "-" symbol" may be used interchangeably with "second delimiter character." In some embodiments, the first and second delimiter characters may be any delimiter character supported by the software languages and/or tools (e.g., Apache Solr™) used to implement the disclosed systems and methods. In some embodiments, the first and second delimiter characters may be the same character.

In each pair of CQ characters, the first CQ character may indicate the entity code, whereas the second character may indicate a sequence count. The entity code is the hexadecimal base 62 ASCII conversion of the Entity Type number for the data table in which the data value was stored in the relational database. It should be appreciated that the Entity Type number may be arbitrarily and uniquely assigned to each relational data table for use in converting the data to the CQ format. As an example, the fifth listed tuple in the first block contains "0-0" as the nested hierarchy data. In this example, the Entity Type number of the "Parent" table is 1; therefore, the converted entity code is 0.

Similarly, in each pair of CQ characters, the second CQ character may indicate the sequence count. The sequence count is an number that starts at zero and increments with each unique data value within the scope of each row in the delimited CQ NoSQL database. Consequently, the sequence count indexes a sequence count value to a particular value of a particular parameter. In the present example, the sequence count of the first pair of CQ characters indexes unique PARNT_ID values. As depicted, the "Parent" table only contains one row, which has a PARNT_ID value of "##5I$TGQ#0." Since this is the first (and only) unique PARNT_ID value, the first sequence count indexes the PARNT_ID value of "##5I$TGQ#0" to 0. Accordingly, the sequence count value for the fifth tuple of the first block of data is 0.

Looking now to the second block of tuples, this block represents data values that were originally stored in the "Child1" table in the relational database. The second block of tuples may be further divided into sets based on the particular row in the unloaded "Child1" data in which the data value is stored. In this example, the unloaded "Child1" data comprises three rows corresponding to the three sets of tuples. The tuples in the second block may contain two sets of hierarchy data divided by a "#" symbol, indicating that the "Child1" table is one hierarchical level below the "Parent" table in the parental hierarchy. As an example, the hierarchy data of the first tuple in the second block of tuples comprises "0-0#1-0." The first pair of CQ characters in the hierarchy data may identify the PARNT_ID values. The second pair of characters may identify CHILD_ID values. Since the tuples in the first block of tuples share the same parent row in the "Parent" table, the first pair of CQ characters may be identical for each of these tuples.

Like the first pair of CQ characters, the second pair of CQ characters also represents an entity code followed by a sequence count. In the depicted example, the Entity Type number of the "Child1" table is 2; therefore, the entity code character for the second pair of CQ characters is 1. In the present example, the sequence count of the second pair of CQ characters indexes unique CHILD_ID values. More particularly, the "Child1" table contain three rows having three unique CHILD_ID values. Accordingly, the first unique CHILD_ID ("77") is indexed to a sequence count value of 0, the second unique CHILD_ID ("321") is indexed to a sequence count value of 1, and the third unique CHILD_ID ("103") is indexed to a sequence count value of 2. Therefore, for tuples in the first, second and third sets of tuples corresponding to the rows in the "Child1" table with respective CHILD_ID values of "77," "321," and "103,", the sequence count value may be 0, 1 and 2, respectively.

Looking now to the third block of tuples, this block represents data values that were originally stored in the "Grand_Child_Name" table in the relational database. Like the second block of tuples, the third block of tuples is further divided into sets of tuples based on the row in unloaded data that the data value is stored. Since the unloaded "Grand_Child_Name" data contained four rows, the third block is broken into four corresponding sets of tuples. Continuing the pattern, since the "Grand_Child_Name" table is two hierarchal levels downs in the parental hierarchy, the hierarchy data may contain three pairs of characters divided by a "#" symbol: the first set representative of the respective PARENT_ID values, the second set representative of the respective CHILD_ID values, and the third set representative of the respective NM_TYPE_CD values.

In the depicted example, the Entity Type number of the "Grand_Child_Name" table is 34 which corresponds to an entity code of X. Accordingly, all tuples in this third block of tuple contain X as the entity code of the third pair of CQ characters. In the present example, the sequence count of the third pair of characters indexes unique NM_TYPE_CD values. In this example, both the second and third sets of tuples correspond to the second row of "Child1" table having a CHILD_ID value of "321." Hence, both of these sets of tuples contain 1 as the sequence count value for the second pair of CQ characters. However, the two sets of data are stored in different rows in the source "Grand_Child_Name" table, each having different NM_TYPE_CD values.

Thus, the first unique NM_TYPE_CD ("LEGAL") is indexed to a sequence count value of 0, and the second unique NM_TYPE_CD ("PREFERRED") is indexed to a sequence count value of 1. It should be appreciated that the NM_TYPE_CD sequence count values start at zero for each CHILD_ID value. Accordingly, in the fourth set of tuples, "PROFESNL" is the first unique NM_TYPE_CD for data values having a CHILD_ID value of "103" indexed to a NM_TYPE_CD sequence count value of 0. Thus, the NM_TYPE_CD sequence count value of 0 may represent different parameter values depending on the sequence count values describing higher levels of data in the hierarchical relationship.

Finally, after the column qualifier, each tuple contains a data value. This data value may represent the data stored in the location represented by the column qualifier. The data value may be the same as the data value of the corresponding attribute of the unloaded data in the lower box of FIG. 2. Although FIG. 3 depicts tuples containing a "<null>" value, no null character is actually stored in the delimited CQ NoSQL database, as the tuple that has a null value is not actually written to the delimited CQ row.

Although the example depicted in FIGS. 2-3 illustrate a three-tier hierarchy, other hierarchies containing more or fewer hierarchical levels are also envisioned. For hierarchy structures that contain more than three hierarchical levels, the pattern of adding another entity code and sequence count pair per hierarchical level continues until the data value's location in the data table in lowest hierarchical level is represented by the respective hierarchy data. Further, although the example depicted in FIGS. 2-3 use the "#" symbol as the first delimiter character and the "-" symbol as the second delimiter character, the first and second delimiter characters may be any appropriate delimiting character. In some implementations, both the first and second delimiter characters may be the same character.

Generally, it is envisioned that, for a particular data value, the number of pairs of CQ characters in the column qualifier corresponds to the hierarchical level of the data table in which the data value is stored in the relational database. In this example, since the "Grand_Child_Name" is in the third hierarchical level, there are three pairs of CQ characters. Accordingly, when there are multiple pairs of CQ characters, each pair of CQ characters may describe a different hierarchical level. Further, although the present example indexes PARENT_ID values with the first sequence count value, CHILD_ID values with the second sequence count value, and NM_TYPE_CD with the third sequence count value, this is merely an exemplary implementation. It is envisioned that the present invention encompasses other implementations that utilize sequence counts to index other appropriate parameters. For example, another implementation may use a first sequence count to index an account number and a second sequence count to index individuals associated with the account.

III. Exemplary Ingestion Process

Figure 4:
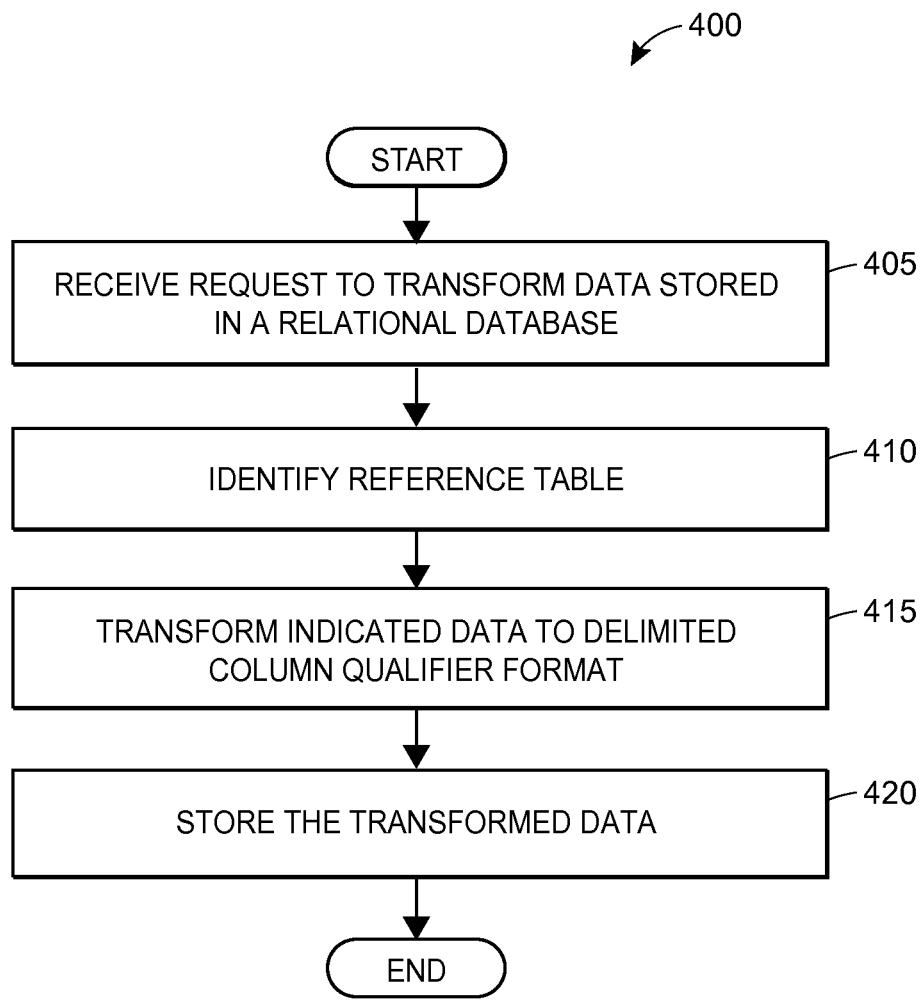
FIG. 4 depicts a flow diagram of an example method for ingesting relational data into a delimited column qualifier NoSQL database, which can be implemented in the ingestion server depicted in FIG. 1, in accordance with some embodiments.

Referring to FIG. 4, depicted is a block diagram of an exemplary method 400 for ingesting relational data. The method 400 may be facilitated by an ingestion server (such as the ingestion server 115 as depicted in FIG. 1).

The ingestion server may receive (block 405) a request to transform data stored in a relational database (such as relational database 120 as depicted in FIG. 1). The request may include an indication of a particular set of data stored in the relational database that is to be transformed. This indication may include an identification of a plurality of data values stored in plurality of rows in a plurality of data tables in the relational database. In some embodiments, the indicated set of data values may comprise data that has been recently modified. In further embodiments, the indicated set of data values may comprise an entire data table to transform.

After receiving the request to transform the set of data values, the ingestion server may identify (block 410) a reference table that defines the data storage structure of a delimited column qualifier NoSQL database (such as delimited CQ NoSQL database 130 as depicted in FIG. 1). According to some embodiments, the ingestion server may maintain a default reference table. If a reference table is not received as part of the request to transform data, this default reference table may be the identified reference table. In embodiments in which the request to transform data includes a reference table, the received reference table may be the identified reference table. In some further embodiments, the request to transform data may include an indication that the received reference table should replace the default reference table. For example, the request to transform data may include a request to transform data stored in a data table that has not yet been converted to the delimited CQ format. As part of the request, an updated reference table may be included indicating how to transform the data stored in the previously unconverted data table.

The ingestion server may then transform (block 415) the indicated data into a delimited column qualifier format. The transformation may begin by identifying the Entity Type number for each data table in the relational database to which each indicated row of data belongs. The Entity Type number may be an arbitrary number uniquely identifying a particular data table in the relational database. For instance, in the example depicted in FIGS. 2-3, the "Child1" table is assigned an Entity Type number of 1. The ingestion server may then translate the Entity Type number assigned to the data table to a Base 62 ASCII entity code (62 is representative of the number of characters in the character set of 0-9, a-z, and A-Z). If the Entity Type number is greater than 62, than the entity code may comprise two or more characters. For example, the number 17 converts to an entity code of "G," while the number 85 translates to an entity code of "0G," the number 425 translates to an entity code of "5q," and the number 962 translates to an entity code of "04V."

The ingestion server may also query the reference table to identify a set of entries indicating how each attribute described by a row from the indicated data table should be transformed. Returning to the example depicted in FIGS. 2-3, a reference table indicating how to transform data stored in a "Child1" table would include an entry for how to transform each of the PARNT_ID, CHILD_ID, PRTY_ID, PNI_IND, GNDR_CD, BIRTH_DT, and DISCL_DT attributes. Looking at the GNDR_CD attribute in particular, an entry in the reference table may indicate that the corresponding data value is a one character string, and that the column number assigned to GNDR_CD attribute of the "Child1" table is "AF."

The reference table may further include a skeleton column qualifier for each attribute of the data tables containing the indicated rows of data to transform. For the GNDR_CD example, this skeleton column qualifier may be "S#0-*#1-*#AF." This skeleton column qualifier incorporates the indication of the data format ("S"), the entity codes of the pairs of CQ characters identifying the source and every parent data table thereof ("0-*#1-*"), and the column name of the GNDR_CD attribute ("AF"). The sequence counts in the pairs of CQ characters are represented as a "*" in the skeleton column qualifier since the count of unique data values for the correspondingly indexed parameter may vary. The ingestion server may query the reference table for the skeleton column qualifier corresponding to each attribute indicated in the request to transform relational data.

Once the ingestion server queries the skeleton column qualifier, the ingestion server may then determine the sequence count(s) to generate the completed column qualifier. As described above, for each data value indicated in the request to transform data, the sequence count indicates a unique data value for an indexed data parameter, such as PARNT_ID, CHILD_ID, or NM_TYPE_CD, as discussed above. In some embodiments, the sequence count values are included in the request to transform data. In other embodiments, the ingestion server may query the relational database to determine the sequence count values. The ingestion server may complete the generation of each column qualifier by plugging the corresponding sequence count value(s) into the corresponding location(s) in each skeleton column qualifier. The ingestion server may generate the column qualifier for each data value indicated in the received request.

After generating the column qualifiers for each of the indicated data values, the ingestion server may then store (block 420) the column qualifier data in the delimited CQ NoSQL database. In some cases, data currently stored in the delimited CQ NoSQL database in the location represented by the column qualifier is overwritten or modified. In other cases, new storage resources are allocated by the ingestion server for storage. By storing the generated column qualifiers in the delimited CQ NoSQL database, less storage is used by the overall system than storing the corresponding data in the relational database or in a positional column qualifier database. Accordingly, in some embodiments, the corresponding entry in the relational database is deleted once the data value is stored in the delimited CQ NoSQL database. The method 400 may include additional, fewer, or alternate actions, including those discussed elsewhere herein.

IV. Exemplary Ingestion Server

Figure 5:
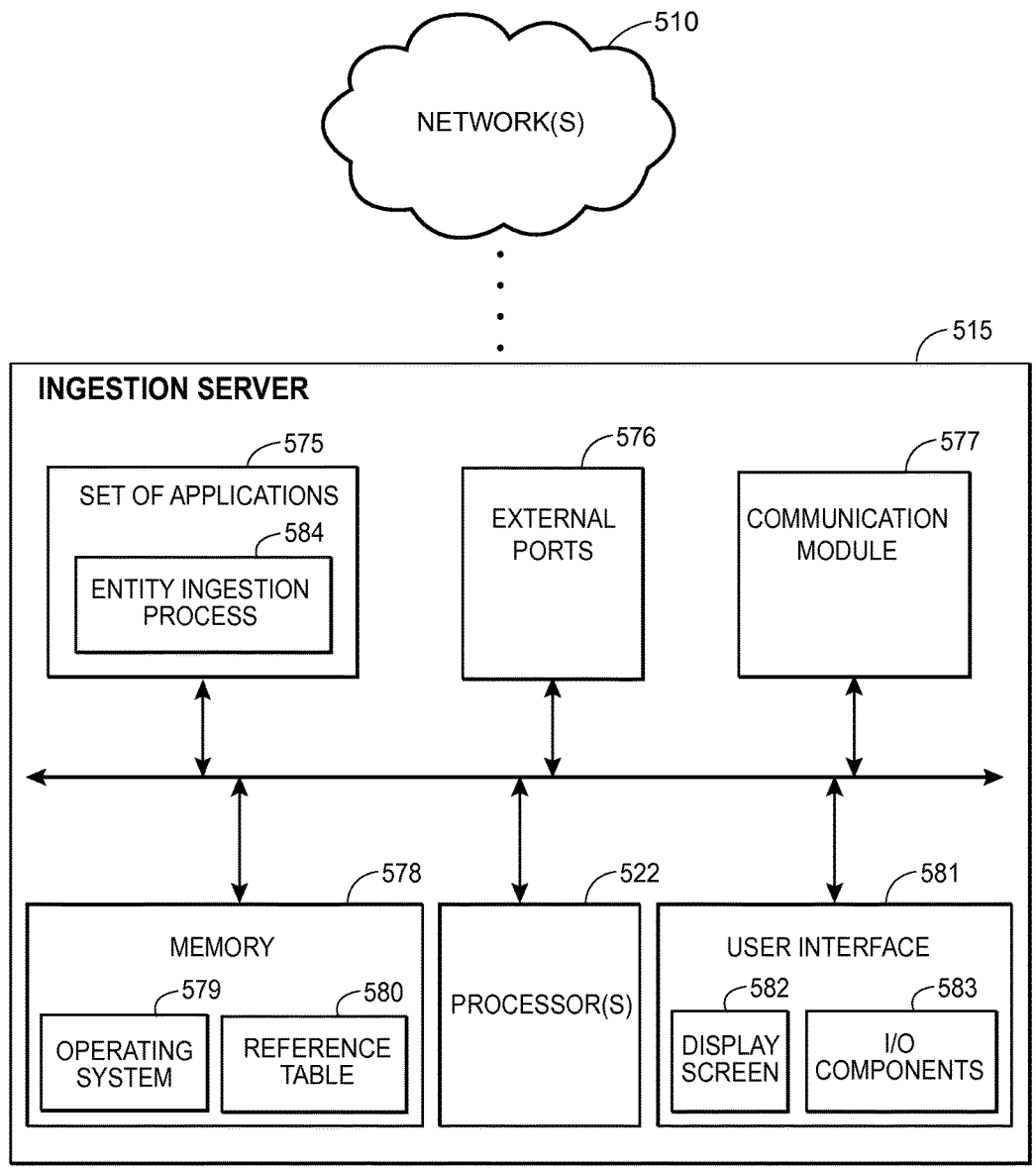
FIG. 5 depicts a block diagram of an ingestion server, such as the ingestion server depicted in FIG. 1, in accordance with some embodiments.

FIG. 5 illustrates a diagram of an exemplary ingestion server 515 (such as the ingestion server 115 as discussed with respect to FIG. 1) in which the functionalities as discussed herein may be implemented. It should be appreciated that the ingestion server 515 may be associated with a company that maintains both a relational database and a delimited CQ NoSQL database, as discussed herein.

The ingestion server 515 may include one or more processors 522 as well as a memory 578. The memory 578 may store an operating system 579 capable of facilitating the functionalities as described herein. The ingestion server 515 may also store a set of applications 575 (e.g., machine readable instructions). For example, one of the set of applications 575 may be an entity ingestion process 584 configured to ingest data from the relational database into a delimited column qualifier database. It should be appreciated that other applications are envisioned.

The one or more processors 522 may interface with the memory 578 to execute the operating system 579 (e.g., Microsoft Windows®, Linux®, IBM AIX®, etc.) and the set of applications 575. According to some embodiments, the memory 578 may also include a reference table 580. The entity ingestion process 584 may access the reference table 580 to ingest data stored in the relational database. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The ingestion server 515 may further include a communication module 577 configured to communicate data via one or more networks 510. According to some embodiments, the communication module 577 can include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may receive, via the network 510, a request to ingest data stored in a relational database. As another example, the communication module 577 may also receive a reference table. As described above, in some embodiments, the reference table received by the communication module 577 may be stored as the reference table 580 within the memory 578. The ingestion server 515 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to the present embodiments, the user may access the ingestion server 515 via the user interface 581 to process update the operating system 579 and/or perform other functions. In some embodiments, the ingestion server 515 may perform the functionalities as discussed herein as part of a "cloud" network or can otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the one or more processors 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

V. Additional Considerations

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

What is claimed:

1. A computer-implemented method for ingesting data stored in a relational database into a delimited column qualifier database, the method comprising:
receiving, via a computer network, a request to transform the data stored in the relational database into a format consistent with a delimited column qualifier database, the request including an indication of a set of the data stored in the relational database to be transformed;
identifying, by one or more processors, a reference table, wherein the reference table defines the data format of the delimited column qualifier database;
transforming, by the one or more processors, the indicated set of the data stored in the relational database to the delimited column qualifier format defined within the reference table, wherein transforming the indicated set of data includes transforming an Entity Type corresponding to the indicated set of data into a translated entity code that is represented by an ASCII hexadecimal entity code using a base 62 conversion;
generating, by the one or more processors, a column qualifier for each data value within the indicated set of data, the column qualifier including:
(i) the translated entity code corresponding to a relational data table of a plurality of relational data tables in which the data value is stored in the relational database, (ii) a sequence count indexing data values for a particular parameter associated with the relational data table in which the data value is stored in the relational database, and (iii) a second delimiter character between the translated entity code and the sequence count,
(i) the translated entity code corresponding to a relational data table of the plurality of relational data tables in which every parent of the data value is stored in the relational database, (ii) a sequence count indexing data values for a particular parameter associated with the relational data table in which every parent of the data value is stored in the relational database, and (iii) the second delimiter character between the respective translated entity code and the sequence count corresponding to every parent of the data value, and
a first delimiter character between each respective set of translated entity codes, second delimiter characters, and sequence counts; and
storing, by the one or more processors, the transformed data, including the column qualifier for each data value, in the delimited column qualifier database part, wherein the delimited column qualifier database requires less storage than the relational database to store the same data.

2. The computer-implemented method of claim 1, further comprising:
receiving, via the computer network, the reference table as part of the request to transform data.

3. The computer-implemented method of claim 1, further comprising:
corresponding, by the one or more processors, each column of the delimited column qualifier database to a unique name.

4. The computer-implemented method of claim 1, wherein transforming the indicated set of data further comprises:
querying, by the one or more processors, the reference table to identify a series of entries defining how to convert data stored in the plurality of relational data tables corresponding to respective subsets of the indicated set of data; and
querying, by the one or more processors, the reference table to identify a column name to associate with transformed data for each data value within the indicated set of data.

5. The computer-implemented method of claim 1, wherein the column qualifier for each data value within the indicated set of data further comprises:
an indication of the format of the data value.

6. The computer-implemented method of claim 1, wherein storing the transformed data in the delimited column qualifier database comprises:
storing the transformed data in an HBase database.

7. A system for ingesting data stored in a relational database into a delimited column qualifier database, the system comprising:
a communication module to communicate data;
a non-relational delimited column qualifier database;
a memory adapted to store non-transitory computer executable instructions; and
one or more processors adapted to interface with the communication module and the delimited column qualifier database, wherein the one or more processors are configured to execute the non-transitory computer executable instructions to cause the one or more processors to:
receive, via the communication module, a request to transform the data stored in the relational database into a format consistent with a delimited column qualifier database, the request including an indication of a set of the data stored in the relational database to be transformed;
identify, by the one or more processors, a reference table, wherein the reference table defines the data format of the delimited column qualifier database;
transform, by the one or more processors, the indicated set of the data stored in the relational database to the delimited column qualifier format defined within the reference table, wherein transforming the indicated set of data includes transforming an Entity Type associated with the indicated set of data into a translated entity code that is represented by an ASCII hexadecimal entity code using a base 62 conversion;
generate, by the one or more processors, a column qualifier for each data value within the indicated set of data, the column qualifier including:
(i) the translated entity code corresponding to a relational data table of a plurality of relational data tables in which the data value is stored in the relational database, (ii) a sequence count indexing data values for a particular parameter associated with the relational data table in which the data value is stored in the relational database, and (iii) a second delimiter character between the translated entity code and the sequence count,
(i) the translated entity code corresponding to a relational data table of the plurality of relational data tables in which every parent of the data value is stored in the relational database, (ii) a sequence count indexing data values for a particular parameter associated with the relational data table in which every parent of the data value is stored in the relational database, and (iii) the second delimiter character between the respective translated entity code and the sequence count corresponding to every parent of the data value, and a first delimiter character between each respective set of translated entity codes, second delimiter characters, and sequence counts; and store, by the one or more processors, the transformed data, including the column qualifier for each data value, in the delimited column qualifier database, wherein the delimited column qualifier database requires less storage than the relational database to store the same data.

8. The system of claim 7, wherein the one or more processors are further configured to execute the non-transitory computer executable instructions to cause the one or more processors to:

correspond, by the one or more processors, each column of the delimited column qualifier database to a unique name.

9. The system of claim 7, wherein to transform the indicated set of data, the one or more processors are further configured to execute the non-transitory computer executable instructions to cause the one or more processors to:

query, by the one or more processors, the reference table to identify a series of entries defining how to convert data stored in the plurality of relational data tables corresponding to respective subsets of the indicated set of data; and query, by the one or more processors, the reference table to identify a column name to associate with transformed data for each data value within the indicated set of data.

10. The system of claim 7, wherein the column qualifier for each data value within the indicated set of data further comprises:

an indication of the format of the data value.

11. A non-transitory computer-readable storage medium storing processor-executable instructions, that when executed cause one or more processors to:

receive, via a communication network, a request to transform data stored in a relational database into a format consistent with a delimited column qualifier database, the request including an indication of a set of data stored in a relational database to be transformed;

identify, by the one or more processors, a reference table, wherein the reference table defines the data format of the delimited column qualifier database;

transform, by the one or more processors, the indicated set of data stored in the relational database to the delimited column qualifier format defined within the reference table, wherein transforming the indicated set of data includes transforming an Entity Type associated with the indicated set of data into a translated entity code that is represented by an ASCII hexadecimal entity code using a base 62 conversion;

generate, by the one or more processors, a column qualifier for each data value within the indicated set of data, the column qualifier including:

(i) the translated entity code corresponding to a relational data table of a plurality of relational data tables in which the data value is stored in the relational database, (ii) a sequence count indexing data values for a particular parameter associated with the relational data table in which the data value is stored in the relational database, and (iii) a second delimiter character between the translated entity code and the sequence count, (i) the translated entity code corresponding to a relational data table of the plurality of relational data tables in which every parent of the data value is stored in the relational database, (ii) a sequence count indexing data values for a particular parameter associated with the relational data table in which every parent of the data value is stored in the relational database, and (iii) the second delimiter character between the respective translated entity code and the sequence count corresponding to every parent of the data value, and a first delimiter character between each respective set of translated entity codes, second delimiter characters, and sequence counts; and store, by the one or more processors, the transformed data, including the column qualifier for each data value, in the delimited column qualifier database, wherein the delimited column qualifier database requires less storage than the relational database to store the same data.

12. The system of claim 11, wherein the processor-executable instructions, when executed, further cause one or more processors to:

correspond, by the one or more processors, each column of the delimited column qualifier database to a unique name.

13. The system of claim 11, wherein to transform the indicated set of data, the processor-executable instructions the further cause the one or more processors to:

query, by the one or more processors, the reference table to identify a series of entries defining how to convert data stored in the plurality of relational data tables corresponding to respective subsets of the indicated set of data; and query, by the one or more processors, the reference table to identify a column name to associate with transformed data for each data value within the indicated set of data.

14. The system of claim 11, wherein the column qualifier for each data value within the indicated set of data further comprises:

an indication of the format of the data value.

* * * * *